United States Patent [19]

Felber

[11] Patent Number: 4,549,817

[45] Date of Patent: Oct. 29, 1985

[54] THERMAL MONITORING APPARATUS FOR TRANSFORMERS OR CHOKES

[75] Inventor: Willibald Felber, Weiz, Austria

[73] Assignee: Elin Union AG, Vienna, Austria

[21] Appl. No.: 551,601

[22] Filed: Nov. 14, 1983

[30] Foreign Application Priority Data

Nov. 15, 1982 [AT] Austria ............ 4142/82

[51] Int. Cl.[4] ............ G01K 1/12

[52] U.S. Cl. ............ 374/152; 361/37

[58] Field of Search ............ 374/152; 361/37; 62/125

[56] References Cited

U.S. PATENT DOCUMENTS

| | | | |
|---|---|---|---|
| Re. 31,685 | 9/1984 | Weiler | 374/152 |
| 3,144,770 | 8/1964 | Sheely | 374/152 |
| 3,483,751 | 12/1969 | Walker | 374/152 X |
| 3,491,597 | 1/1970 | Engelhardt et al. | 374/152 X |
| 4,394,635 | 7/1983 | Foss | 374/152 X |

*Primary Examiner*—Daniel M. Yasich

*Attorney, Agent, or Firm*—Werner W. Kleeman

[57] ABSTRACT

An electrical component such as a transformer winding or choke coil is placed in a forced cooling circuit containing circulation pumps and coolers for a cooling medium and is subjected to forced circulation cooling. The thermal monitoring apparatus comprises a container housing therein a thermal sensor surrounded by a thermosensor winding. The container is connected by respective branch lines to the forced cooling circuit either upstream or downstream with respect to the circulation pumps. Cooling medium flows through the transformer or choke coil in the forced cooling circuit and through the branch lines leading to the container. Each branch line is provided with an equivalent hydraulic resistance of the transformer winding and the cooler. The thermosensor winding is connected to a current transformer which is supplied with a current which is proportional to the current flowing through the transformer or choke coil.

12 Claims, 3 Drawing Figures

THERMAL MONITORING APPARATUS FOR TRANSFORMERS OR CHOKES

BACKGROUND OF THE INVENTION

The present invention relates to a new and improved thermal monitoring apparatus for an electrical component, such as a transformer winding or choke coil.

In its more particular aspects the present invention relates specifically to a new and improved thermal monitoring apparatus for a transformer or choke coil provided with forced circulation cooling, especially forced circulation oil cooling and a forced flow of the cooling medium through the transformer winding or the choke coil. The thermal monitoring apparatus comprises a container or vat filled by the cooling medium and a thermosensor including a thermosensor winding surrounding the thermosensor. The thermosensor winding is supplied via a current transformer with a current which is essentially proportional to the current flowing through the transformer winding or choke coil.

Transformers provided with forced oil cooling have known advantages, but also have the disadvantage that in the case of failure of the oil pumps and thus of the forced oil cooling of the windings of the electrical component to be monitored, the cooling of the windings is strongly impaired. In conformity with emergency procedures or operational regulations the measures to be undertaken in the event of such a defect or malfunction entail a reduction or cut-off in the power supply so as to prevent either the thermal destruction or the electrical destruction of the transformer, the latter being a direct consequence of gas development. When the transformer station constitutes an unmanned transformer station such objectives must be carried out by appropriate protective devices.

Presently, the so-called "thermal replica or copy" is still preferably employed for monitoring the thermal state of large-size transformers. A temperature sensor or feeler is placed in the oil which has the highest temperature and superposed thereon by means of a heater winding is the calculated hot spot temperature difference or surge between winding and oil. Depending upon the kind of apparatus, the temperature sensor may form a resistance wire for remote indication or a liquid-filled chamber for direct indication including control contacts. The heater winding is supplied with a current which is proportional to the current flowing in the transformer or choke coil by means of a "thermal replica transformer" and is intended to be matched to the thermal behavior of the transformer or choke coil which is to be monitored. In most cases the latter requirement is only approximately fulfilled since it is impossible for practical reasons to take account of the multitude of parameters when using a single heater winding. Finally, the aforementioned hot spot temperature difference or surge is adjusted with regard to a calculated or measured operative state by means of a variable current flowing through the heater winding by means of a parallel connected resistor. This kind of adjustment does not change the thermal resistance of the heater winding. Consequently, it will be recognized that the thermal replica or copy is only able to correctly indicate the final value of the temperature difference or surge without specific adaptation to the thermal resistance of the transformer winding or choke coil to be monitored, however, is unable to indicate the actual temperature pattern or variation as a function of load variation within the range of 2 to 3 time-constants of the winding.

As mentioned hereinbefore the thermal replica is well suited to indicate the thermal state during standard operation of transformers which are cooled in such a manner. However, in the case of failure of all of the oil circulation pumps the thermal parameters of the windings are drastically changed. On the one hand, the heat transmission resistance increases to a multiple of the value which can be attained using forced oil flow. On the other hand, there develops a large temperature spread or differential along the winding to be cooled in order to just maintain only a small natural oil flow through the relatively high hydraulic resistances formed by the cooler and the winding. This ultimately pronounced increase in the hot spot temperature is not indicated by the normal thermal replica since the same is adjusted to the thermal resistance of the winding existing during standard or normal operation.

SUMMARY OF THE INVENTION

Therefore, with the foregoing in mind, it is a primary object of the present invention to provide a new and improved thermal monitoring apparatus for an electrical component, such as a transformer winding or choke coil, which is not afflicted with the aforementioned drawbacks and limitations of the prior art systems heretofore discussed.

Another and more specific object of the present invention is directed to the provision of a new and improved thermal monitoring apparatus for a transformer winding or choke coil, wherein there is afforded an adequate and reliable thermal monitoring of the transformer winding or choke coil which is provided with forced circulation cooling and forced flow of the cooling medium through the winding of the transformer or choke coil.

Now, in order to implement these and still further objects of the invention, which will become more readily apparent as the description proceeds, the thermal monitoring apparatus of the present development is manifested by the features that, the container is supplied with a portion of the cooling agent or medium conveyed from the transformer or choke coil tank via a circulation pump and a cooler, and a branch line for the cooling medium is provided upstream or downstream of the circulation pump and upstream of the cooler.

By means of the inventive thermal monitoring apparatus it is now possible for the first time to duplicate or image the actual thermal and hydraulic conditions prevailing in the transformer winding or choke coil using one apparatus. An optimal thermal monitoring of the transformer or other electrical component is thus afforded in the event of an emergency operation, such as required when circulation pumps fail.

In accordance with a further specific development of the thermal monitoring apparatus according to the invention the container is disposed inside the transformer tank. The oil temperature within the transformer tank is thus determinative for the temperature level in the thermal replica apparatus.

According to a further feature of the inventive thermal monitoring apparatus the container is arranged outside the transformer tank. In such case the container may be placed in a switch cabinet, namely in the event that the thermal replica apparatus is only used for the transformer winding.

A special further design of the thermal monitoring apparatus according to the invention resides in the fact that an equivalent hydraulic resistance, which constitutes the hydraulic equivalent of the transformer winding, is provided in a branch line conducting the cooling medium, typically oil to the thermosensor winding. In the event of a failure in the forced oil flow the hydraulic resistance of the transformer winding thereby becomes effective for the thermosiphon cooling action.

According to a further feature of the inventive thermal monitoring apparatus an equivalent hydraulic resistance, which is the hydraulic equivalent of the oil cooler, is provided in the branch line. In the case of a failure of the forced oil flow the hydraulic resistance of the oil cooler thereby becomes effective for the thermosiphon action.

According to one additional aspect of the thermal monitoring apparatus according to the invention a non-return or check valve or a hydraulic shut-off element is provided as an equivalent resistance. Such design constitutes a simple realization of the equivalent resistance. Certainly, such a design is optimal in economic terms.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various Figures of the drawings there have been generally used the same reference characters to denote the same or analogous components and wherein.

DETAILED DESCRIPTION OF THE PREFERRED EMBODIMENTS

Figure 1:
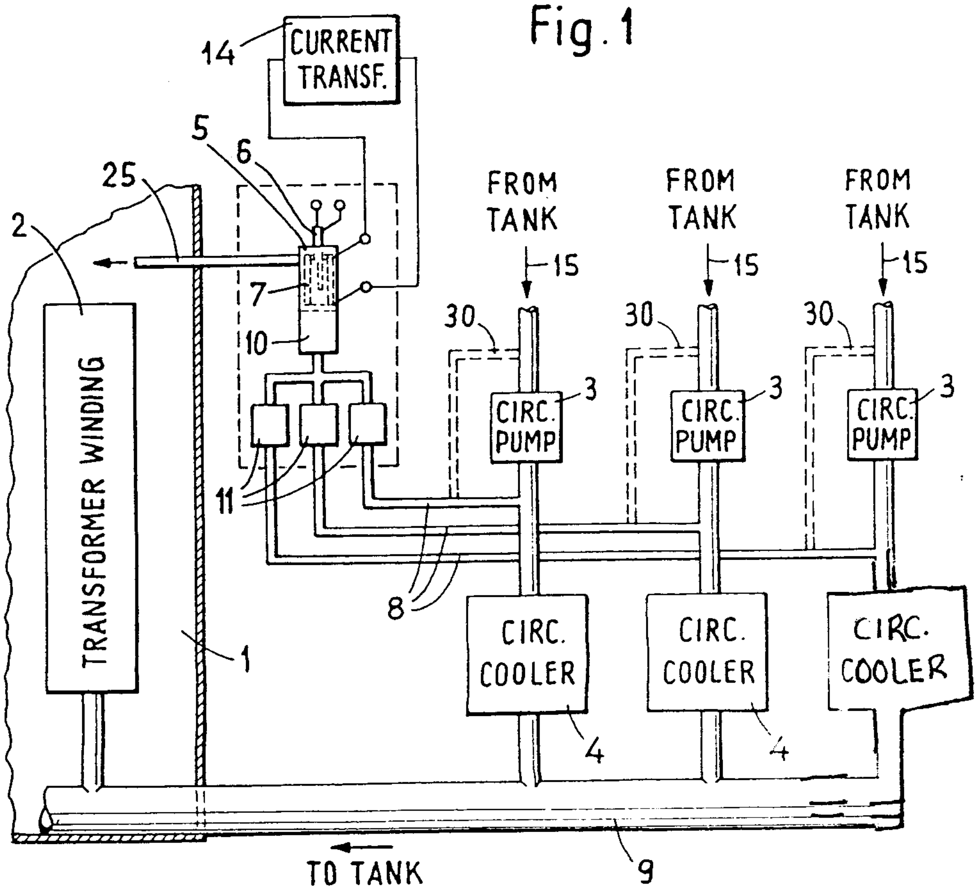
FIG. 1 shows a schematic block diagram of a cooling circuit for an electrical component, such as a transformer winding and into which a thermal monitoring apparatus according to the invention is incorporated.
Figure 2:
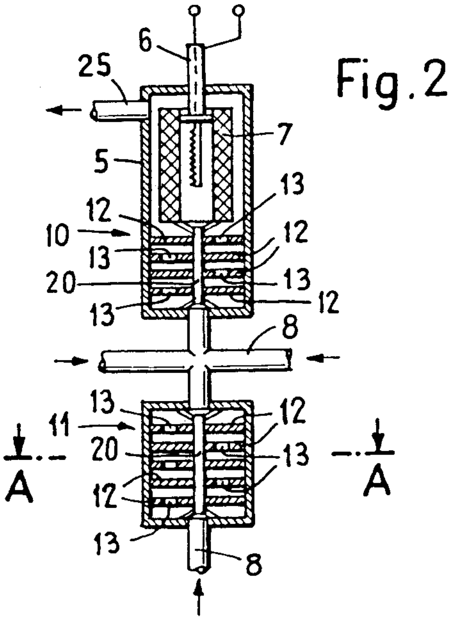
FIG. 2 is a fragmentary sectional view illustrating details of the thermal monitoring apparatus shown in FIG. 1.
Figure 3:
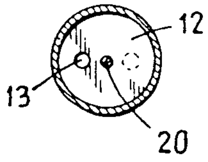
FIG. 3 is a sectional view taken substantially along the line A—A of FIG. 2.

Describing now the drawings, it is to be understood that only enough of the construction of the thermal monitoring apparatus and related structure has been shown as needed for those skilled in the art to readily understand the underlying principles and concepts of the present development, while simplifying the showing of the drawings. Turning attention now specifically to FIG. 1, there has been schematically illustrated by way of a block diagram a tank, such as a transformer tank 1 in which a transformer winding 2 is arranged. Obviously, the tank 1 can contain a different electrical component which is to be monitored and protected, such as a choke coil. Oil circulating pumps 3 and oil coolers 4 are provided outside the transformer tank 1 in the forced circulation cooling circuit and are intended for the forced oil cooling of the transformer winding 2. As generally known, the forced cooling of the winding 2 or the like is based upon the fact that the oil which is withdrawn from the transformer tank 1 is again recirculated into such transformer tank 1 and directly into or through the windings 2 by means of the circulating pumps 3 and via the oil coolers 4. Means such as a conduit 9 leading to the tank 1 and connections leading from the tank 1 and indicated by arrows 15, operatively connect the circulation pumps 3 and the oil coolers 4 with the tank 1 and thus form a circuit for the forced cooling of the transformer winding 2 by the cooling medium.

The thermal monitoring apparatus comprises a container or vat 5 which, in the illustrated exemplary embodiment, is disposed outside the transformer tank 1 but, as previously stated, also can be placed inside thereof. The thermal monitoring apparatus further comprises a thermosensor or thermofeeler 6 and a thermosensor winding or winding means 7 which surrounds the thermosensor 6. The thermosensor winding 7 is supplied in conventional manner with a current which is proportional to the current flowing through the transformer winding 2 by a current transformer 14 or equivalent device of known structure which, therefore, is not here shown in any particular detail. Furthermore, oil which originates from the transformer tank 1 is fed to the container or vat 5 via one or a number of branch lines 8. The oil is branched-off by the branch lines 8 from the main lines or conduits 9 of the forced cooling circuit or circulation system after or downstream of the oil circulating pumps 3 and forwardly or upstream of the oil coolers 4 with respect to the direction of oil flow through the forced cooling circuit. However, as schematically indicated by reference character 30 the oil or the like also may be branched-off forwardly or upstream of each of the oil circulating pumps 3 in order to by-pass the same. After flowing around the thermosensor winding 7 the oil is again passed by the line or conduit 25 back into the transformer tank 1. An equivalent hydraulic resistance 10, which is the hydraulic equivalent of the transformer winding 2, is connected forwardly or upstream of the container 5 in a section of the branch lines 8. Upstream or forwardly of the equivalent resistance 10 there is arranged in each branch line 8 a further equivalent hydraulic resistance 11 which is the hydraulic equivalent of the oil coolers 4.

Each one of the equivalent hydraulic resistances 10, 11 may be formed by individual plates 12 comprising bores or apertures 13. The required hydraulic resistance is attained by precisely arranging the plates 12 in well-defined positions and holding the plates 12 together by means of a related spacer bolt 20 or equivalent structure. As previously explained, it would be possible to constitute the equivalent resistances 10 and 11 by check valves or hydraulic shut-off elements.

It still should be noted that instead of using an equivalent hydraulic resistance 10 the thermosensor winding 7 could be correspondingly designed such that it constitutes the equivalent or replica of the transformer winding 2. Equally a number of thermal monitoring apparatus could be parallely connected to monitor a number of transformer windings or choke coils or the like.

In conclusion it is further remarked that the thermal monitoring apparatus according to the invention especially satisfies the requirement of immediately responding to any significantly increased temperature difference or surge between the transformer winding and the oil which occurs in the event of an emergency when only one oil circulating pump 3 or none at all is operating.

While there are shown and described present preferred embodiments of the invention, it is to be distinctly understood that the invention is not limited thereto, but may be otherwise variously embodied and practiced within the scope of the following claims. Accordingly,

What I claimed is:

1. An apparatus for thermal monitoring of an electrical component, such as a transformer winding or choke coil, comprising:

a tank for housing the electrical component and containing a cooling medium;

at least one circulation pump for the cooling medium;

at least one circulation cooler for the cooling medium;

means for operatively connecting said at least one circulation pump and said at least one circulation cooler with said tank and forming a circuit for forced cooling of said electrical component by the cooling medium;

a container operatively associated with said tank and supplied with said cooling medium;

a thermosensor;

a thermosensor winding surrounding said thermosensor;

said thermosensor and said thermosensor winding being arranged within said container;

a current transformer operatively connected to said thermosensor winder and supplying the same with a current which is essentially proportional to current flowing through said electrical component during operation of said electrical component;

means for branching-off part of the cooling medium flowing through said at least one circulation pump and said at least one circulation cooler and for infeeding said branched-off cooling medium to said container; and said branching-off means being operatively associated with said at least one circulation pump and being arranged upstream of said at least one circulation cooler with respect to a predetermined direction of flow of cooling medium through said forced cooling circuit.

2. The apparatus as defined in claim 1, wherein:

said branching-off means comprises at least one branch line for cooling medium connecting said container to said forced cooling circuit; and said at least one branch line being connected to said forced cooling circuit upstream of said at least one circulation pump with respect to said predetermined direction of flow of cooling medium through said forced cooling circuit.

3. The apparatus as defined in claim 1, wherein:

said branching-off means comprises at least one branch line for said cooling medium connecting said container to said forced cooling circuit; and said at least one branch line being connected to said forced cooling circuit downstream of said at least one circulation pump with respect to said predetermined direction of flow of cooling medium through said forced cooling circuit.

4. The apparatus as defined in claim 1, wherein:

said branching-off means comprises at least one branch line for said cooling medium connecting said container to said forced cooling circuit; and said at least one branch line being connected to said forced cooling circuit downstream of said at least one circulation pump and upstream of said at least one circulation cooler with respect to said predetermined direction of flow of cooling medium through said forced cooling circuit.

5. The apparatus as defined in claim 1, wherein:

said container is disposed inside said tank.

6. The apparatus as defined in claim 1, wherein:

said container is disposed outside said tank.

7. The apparatus as defined in claim 1, wherein:

said branching-off means comprises at least one branch line for said cooling medium connecting said container to said forced cooling circuit; and at least one equivalent hydraulic resistance constituting an hydraulic equivalent of said electrical component provided for said at least one branch line.

8. The apparatus as defined in claim 7, further. including:

at least one further equivalent hydraulic resistance constituting an hydraulic equivalent of said circulation cooler provided for said at least one branch line.

9. The apparatus as defined in claim 1, wherein:

said branching-off means comprises at least one branch line for said cooling medium connecting said container to said forced cooling circuit; and at least one equivalent hydraulic resistance constituting an hydraulic equivalent of said at least one circulation cooler provided for said at least one branch line.

10. The apparatus as defined in claim 1, wherein:

said branching-off means comprises at least one branch line for said cooling medium connecting said container to said forced cooling circuit; and equivalent hydraulic resistance means constituting an hydraulic equivalent of said electrical component and said circulation cooler provided for said at least one branch line.

11. The apparatus as defined in claim 1, wherein:

said branching-off means comprises at least one branch line for said cooling medium connecting said container to said forced cooling circuit;

at least one equivalent hydraulic resistance provided for said at least one branch line; and said at least one equivalent hydraulic resistance being formed by a non-return valve.

12. The apparatus as defined in claim 1, further including:

said branching-off means comprises at least one branch line for said cooling medium connecting said container to said forced cooling circuit;

at least one equivalent hydraulic resistance provided for said at least one branch line; and said at least one equivalent hydraulic resistance being formed by an hydraulic shut-off element.

* * * * *